United States Patent
Saeed (10) Patent No.: US 11,953,043 B2
(45) Date of Patent: Apr. 9, 2024

(54) BREAKAWAY THREADED FASTENERS AND ELECTRICAL CONNECTORS HAVING SUCH FASTENERS

(71) Applicant: Hubbell Incorporated, Shelton, CT (US)

(72) Inventor: Dana Khalid Saeed, Lewisville, TX (US)

(73) Assignee: Hubbell Incorporated, Shelton, CT (US)

( * ) Notice: Subject to any disclaimer, the term of this patent is extended or adjusted under 35 U.S.C. 154(b) by 182 days.

(21) Appl. No.: 17/199,624

(22) Filed: Mar. 12, 2021

(65) Prior Publication Data

US 2021/0310511 A1 Oct. 7, 2021

Related U.S. Application Data

(60) Provisional application No. 63/114,332, filed on Nov. 16, 2020, provisional application No. 63/003,449, filed on Apr. 1, 2020.

(51) Int. Cl.
  *F16B 31/00* (2006.01)
  *H01R 4/30* (2006.01)
  *H01R 4/36* (2006.01)

(52) U.S. Cl.
  CPC .......... *F16B 31/00* (2013.01); *H01R 4/302* (2013.01); *H01R 4/36* (2013.01)

(58) Field of Classification Search
  CPC ........ F16B 31/00; F16B 31/021; H01R 4/302; H01R 4/36; H01R 11/28
  See application file for complete search history.

(56) References Cited

U.S. PATENT DOCUMENTS

| 3,468,211 | A | | 9/1969 | Suan | |
|---|---|---|---|---|---|
| 5,201,914 | A | * | 4/1993 | Hollick | H01R 4/36 439/810 |
| 7,214,108 | B2 | | 5/2007 | Barnett | |
| 7,717,658 | B2 | | 5/2010 | Peltier | |
| 8,057,145 | B2 | | 11/2011 | Dolan et al. | |

(Continued)

FOREIGN PATENT DOCUMENTS

| DE | 10234475 A1 | * | 1/2004 | ............. B21K 1/463 |
|---|---|---|---|---|
| DE | 102015102224 A1 | * | 8/2016 | ............ F16B 31/021 |
| EP | 2487755 A1 | * | 8/2012 | ............... H01R 4/36 |

OTHER PUBLICATIONS

Machine Translation DE 10234475 A1, (Jan. 15, 2004), Retrieved from ( https://worldwide.espacenet.com/ ) (Year: 2023).*

(Continued)

*Primary Examiner* — Travis S Chambers
(74) *Attorney, Agent, or Firm* — Ruggiero, McAllister & McMahon LLC (57) ABSTRACT

A breakaway threaded fastener is provided. The fastener has a stud, a pin, and a cap. The stud has a hollow cavity with a closed end, an open end, a wall, and an outer surface. The outer surface has an external thread. The pin is in the hollow cavity. The pin has a first end at the closed end of the stud and a second end extending above the open end of the stud. The cap has another hollow cavity with a closed end, an open end, and an internal thread. The cap is threadably engaged to the open end of the stud via the internal and external threads so that the second end of the pin abuts the closed end of the cap.

16 Claims, 11 Drawing Sheets

(56) References Cited

U.S. PATENT DOCUMENTS

| | | | | |
|---|---|---|---|---|
| 8,550,842 | B1 | 10/2013 | Gutiérrez | |
| 9,366,282 | B2 | 6/2016 | Vallette | |
| 9,689,416 | B2 | 6/2017 | Tamm et al. | |
| 10,760,608 | B2* | 9/2020 | Diniz | H01R 43/04 |
| 11,326,639 | B1* | 5/2022 | Juillet | B25B 23/108 |
| 2008/0066901 | A1* | 3/2008 | Gereluk | E21B 17/06 |
| | | | | 166/242.6 |
| 2014/0322990 | A1 | 10/2014 | Umlauf | |
| 2015/0155640 | A1 | 6/2015 | Frank | |
| 2019/0165498 | A1 | 5/2019 | Saeed | |
| 2022/0145923 | A1* | 5/2022 | Dossmann | F16B 31/021 |
| 2022/0196062 | A1* | 6/2022 | Dossmann | F16B 31/021 |

OTHER PUBLICATIONS

International Search Report dated Aug. 25, 2021 in corresponding International Application No. PCT/US2021/022052.
Written Opinion dated Aug. 25, 2021 in corresponding International Application No. PCT/US2021/022052.

* cited by examiner

FIG. 20

BREAKAWAY THREADED FASTENERS AND ELECTRICAL CONNECTORS HAVING SUCH FASTENERS

CROSS REFERENCE TO RELATED APPLICATIONS

This application claims the benefit of U.S. Provisional No. 63/003,449 filed on Apr. 14, 2020 and claims the benefit of U.S. Provisional No. 63/114,332 filed Nov. 19, 2020, the contents of both which are incorporated by reference herein.

BACKGROUND

1. Field of the Invention

The present disclosure is related to threaded fasteners and electrical connectors. More particularly, the present disclosure is related to breakaway threaded fasteners and electrical connectors having such fasteners.

2. Description of Related Art

Electrical connectors are commonly used to make an electrical and mechanical connection to an electrical conductor. In some instances, the mechanical and electrical connection is maintained using one or more threaded fasteners. Moreover, it is known to use threaded fasteners that have one or more portions that breakaway after securing the electrical conductor in the electrical connector.

It has been determined by the present disclosure that many prior art breakaway threaded fasteners are overly complex leading to one or more of an increased cost of manufacture, an increased difficulty in use, a need for special tools during use, and increased failure modes.

Accordingly, it has been determined by the present disclosure that is a continuing need for breakaway threaded connectors and electrical connectors having breakaway threaded connectors that overcome, alleviate, and/or mitigate one or more of the aforementioned and other deleterious effects of the prior art.

SUMMARY

A breakaway threaded fastener is provided. The fastener has, in some embodiments, a stud, a pin, and a cap. The stud has a hollow cavity with a closed end, an open end, a wall, and an outer surface. The outer surface has an external thread. The pin is in the hollow cavity. The pin has a first end at the closed end of the stud and a second end extending above the open end of the stud. The cap has another hollow cavity with a closed end, an open end, and an internal thread. The cap is threadably engaged to the open end of the stud via the internal and external threads so that the second end of the pin abuts the closed end of the cap.

In some embodiments either alone or together with any one or more of the aforementioned and/or after-mentioned embodiments, the external thread extends between the open and closed ends of the stud.

In some embodiments either alone or together with any one or more of the aforementioned and/or after-mentioned embodiments, the external thread is a single continuous thread.

In some embodiments either alone or together with any one or more of the aforementioned and/or after-mentioned embodiments, the hollow cavity of the stud is threadless.

In some embodiments either alone or together with any one or more of the aforementioned and/or after-mentioned embodiments, the stud and the pin are not threadably engaged.

In some embodiments either alone or together with any one or more of the aforementioned and/or after-mentioned embodiments, the wall of the stud has a thickness sufficient so that the pin has a compressive failure point higher than a tensile failure point of the stud.

In some embodiments either alone or together with any one or more of the aforementioned and/or after-mentioned embodiments, the cap applies a tensile force on the stud through the pin.

In some embodiments either alone or together with any one or more of the aforementioned and/or after-mentioned embodiments, the wall of the stud has a thickness configured to break under tensile loads resulting from a rotational force applied to the cap about a longitudinal axis defined between the open and closed ends of the stud.

In some embodiments either alone or together with any one or more of the aforementioned and/or after-mentioned embodiments, the cap has a hexagonal outer nut.

In some embodiments either alone or together with any one or more of the aforementioned and/or after-mentioned embodiments, the stud has a hexagonal opening in the closed end within the hollow cavity.

In some embodiments either alone or together with any one or more of the aforementioned and/or after-mentioned embodiments, the fastener has an appearance of a normal hexagonal head bolt.

In some embodiments either alone or together with any one or more of the aforementioned and/or after-mentioned embodiments, the stud, pin, and cap are made of electrically conductive materials.

In some embodiments either alone or together with any one or more of the aforementioned and/or after-mentioned embodiments, the pin is a solid rod of material.

In some embodiments either alone or together with any one or more of the aforementioned and/or after-mentioned embodiments, the stud and the cap are made of different alloys with the stud being softer than the cap.

In some embodiments either alone or together with any one or more of the aforementioned and/or after-mentioned embodiments, the stud, pin, and cap are made of the same material or different materials.

A method of assembling a breakaway threaded fastener is also provided. The method, in some embodiments, includes: placing a pin into a hollow cavity of a stud so that a first end of the pin rests on a closed end of the hollow cavity and so that a second end of the pin extends from an open end of the hollow cavity; and threading an internal thread of a cap onto an external thread of the stud so that a closed end of the cap abouts the second end of the pin to place a wall of the stud in tension.

An electrical connector is also provided. The connector includes a cylindrical body, an opening in the cylindrical body, a stud, a pin, and a cap. The cylindrical body has an inner bore defining an electrical conductor receiving area. The opening in the cylindrical body extends into the electrical conductor receiving area and has an internal thread. The stud has an external thread threadably received in the internal thread of the opening. The pin is in an internal cavity of the stud and extends above an upper end of the stud. The cap has a second internal thread threadably engaged with the external thread of the stud covering the pin. The cap has a torque applying feature that is configured to apply a torque to rotate the stud within the internal thread of the opening and place the stud in tension via the pin.

In some embodiments either alone or together with any one or more of the aforementioned and/or after-mentioned embodiments, the internal thread of the cylindrical body is recessed from a surface of the cylindrical body.

In some embodiments either alone or together with any one or more of the aforementioned and/or after-mentioned embodiments, the hollow body also includes a separating wall separating the body into a second conductor receiving area.

In some embodiments either alone or together with any one or more of the aforementioned and/or after-mentioned embodiments, the stud has a hexagonal opening in the closed end within the hollow cavity.

A breakaway threaded fastener is provided. The fastener includes a stud and a cap. The stud has a hollow cavity with a closed end, a wall, and an outer surface with an external thread. The cap has another hollow cavity with an open end and an internal thread. The cap is threadably engaged to the open end of the stud via the internal and external threads. The fastener further includes a minimum wall thickness defined in the wall. The minimum wall thickness breaks the stud into two portions under torsion above a predetermined torsional limit.

In some embodiments either alone or together with any one or more of the aforementioned and/or after-mentioned embodiments, the cap includes an external torque application feature.

In some embodiments either alone or together with any one or more of the aforementioned and/or after-mentioned embodiments, the external torque application feature is a hexagonal outer nut.

In some embodiments either alone or together with any one or more of the aforementioned and/or after-mentioned embodiments, the stud includes an internal torque application feature in the closed end within the hollow cavity.

In some embodiments either alone or together with any one or more of the aforementioned and/or after-mentioned embodiments, the internal torque application feature is a hexagonal opening.

In some embodiments either alone or together with any one or more of the aforementioned and/or after-mentioned embodiments, the fastener has an appearance of a normal hexagonal head bolt.

In some embodiments either alone or together with any one or more of the aforementioned and/or after-mentioned embodiments, the stud and cap are made of electrically conductive materials.

In some embodiments either alone or together with any one or more of the aforementioned and/or after-mentioned embodiments, the stud and the cap are made of different alloys with the stud being softer than the cap.

In some embodiments either alone or together with any one or more of the aforementioned and/or after-mentioned embodiments, the stud and the cap are made of the same material or different materials.

In some embodiments either alone or together with any one or more of the aforementioned and/or after-mentioned embodiments, the minimum wall thickness is defined by a partial taper in the wall. The partial taper is in the hollow cavity offset from the open end of the stud and runs to the closed end of the stud.

In some embodiments either alone or together with any one or more of the aforementioned and/or after-mentioned embodiments, the minimum wall thickness is defined by a full taper in the wall. The full taper is in the hollow cavity and runs from the open end of the stud to the closed end of the stud.

A breakaway threaded fastener is provided. The fastener includes a cap integral to a stud. The cap has an external torque application feature and an open end. The stud has a hollow cavity with a closed end, a wall, and an outer surface. The outer surface has an external thread. The fastener also includes a minimum wall thickness defined in the wall. The minimum wall thickness breaks the stud into two portions under torsion above a predetermined torsional limit.

In some embodiments either alone or together with any one or more of the aforementioned and/or after-mentioned embodiments, the external torque application feature is a hexagonal outer nut.

In some embodiments either alone or together with any one or more of the aforementioned and/or after-mentioned embodiments, the stud has an internal torque application feature at the closed end of the hollow cavity.

In some embodiments either alone or together with any one or more of the aforementioned and/or after-mentioned embodiments, the internal torque application feature is a hexagonal opening in the closed end.

In some embodiments either alone or together with any one or more of the aforementioned and/or after-mentioned embodiments, the fastener has an appearance of a normal hexagonal head bolt.

In some embodiments either alone or together with any one or more of the aforementioned and/or after-mentioned embodiments, the stud and cap are made of electrically conductive materials.

In some embodiments either alone or together with any one or more of the aforementioned and/or after-mentioned embodiments, the minimum wall thickness is defined by a partial taper. The partial taper is offset from the open end of the cap and runs to the closed end of the stud.

In some embodiments either alone or together with any one or more of the aforementioned and/or after-mentioned embodiments, the minimum wall thickness is defined by a full taper. The full taper runs from the open end of the cap to the closed end of the stud.

The above-described and other features and advantages of the present disclosure will be appreciated and understood by those skilled in the art from the following detailed description, drawings, and appended claims.

DETAILED DESCRIPTION

Referring to the drawings and in particular with simultaneous reference to FIGS. 1-8, an exemplary embodiment of a breakaway threaded fastener according to the present disclosure is shown and is generally referred to by reference numeral 10. Advantageously, fastener 10 is a breakaway fastener that has a simple, easy to manufacture, assemble, and use construction. Fastener 10 includes a stud 12, a pin 14, and a cap 16.

Figure 5:
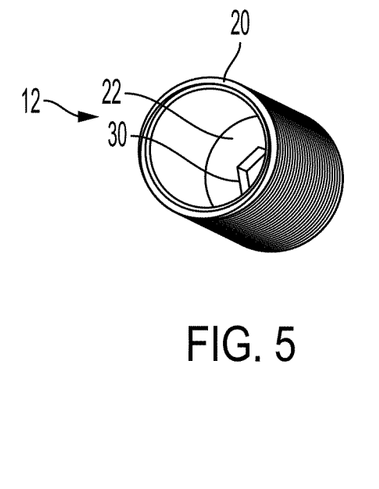
FIG. 5 is a perspective view of an exemplary embodiment of a stud of the fastener of FIG. 1.
Figure 6:
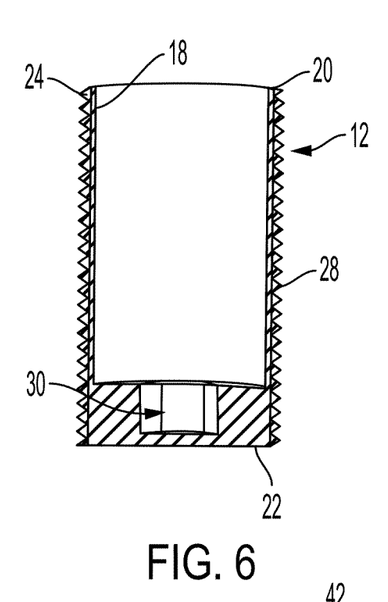
FIG. 6 is a sectional view of the stud of FIG. 5.

Stud 12 is a hollow cylinder having a wall 18, an open end 20, a closed end 22, and an exterior surface 24 of the wall extending along a longitudinal axis 26. Stud 12 includes an external thread 28 on at least a portion of exterior surface 24 at open end 20 and at least a portion of closed end 22. In some embodiments, thread 28 extends from open end 20 to closed end 22.

Stud 12 is configured to breakaway under tension along axis 26. For example, stud 12 can be configured so that wall 18 has a thickness—at least in regions that is thin enough to fail under tension as will be described in more detail herein. In some embodiments, stud 12 has a common thickness to wall 18 as reduced by thread 28 with no additional feature or structure necessary to ensure the breakaway under tension. Thus, stud 12 has a breakaway tensile point that—once exceeded—breaks stud 12 into two portions.

In some embodiments, closed end 22 includes an internal torque application feature 30—illustrated by way of example as a hex opening. As used herein, the term "torque" refers to a rotational force applied to fastener 10 that rotates the fastener about axis 26.

Feature 30 allows for application of a removal torque to stud 12 after installation in a threaded opening and after a portion of the stud has broken away together with pin 14 and cap 16. It should be recognized that fastener 10 is contemplated by the present disclosure to include stud 12 with feature 30 of any desired configuration sufficient to apply torque to the fastener.

Figure 4:
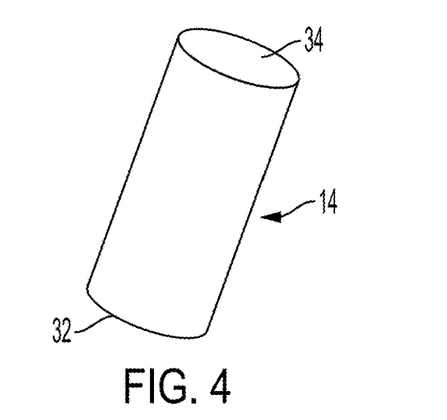
FIG. 4 is a perspective view of an exemplary embodiment of a pin of the fastener of FIG. 1.

Pin 14 is configured and sized to fit within stud 12. For example, pin 14 has an outer diameter that fit in inside diameter of the stud and in an inside diameter of cap 16. In some embodiments, pin 14 has an outer diameter that is larger than an outer diameter of feature 30 so that the pin does not fit into the feature.

Figure 2:
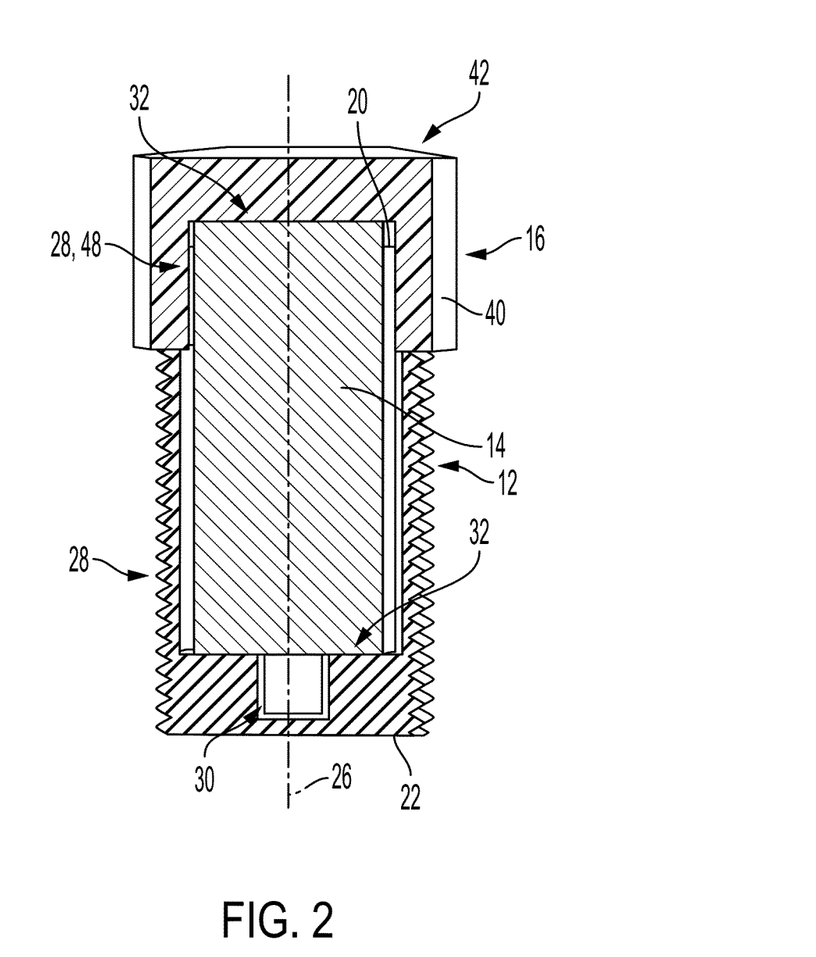
FIG. 2 is a sectional view of the fastener of FIG. 1.

Further, pin 14 has a length sufficient so that a bottom end 32 rests on closed end 22 of stud 12 and a top end 34 extends—at least partially—out of open end 24 of the stud.

It has been determined by the present disclosure that the length that pin 14 extends out of stud 12 can be dependent on the length of cap 16. Specifically, the relationship of the length of pin 12 and cap 16 is such that there is enough threaded engagement between threads 28, 48 to ensure compression on the pin and tension on the stud during use.

Figure 7:
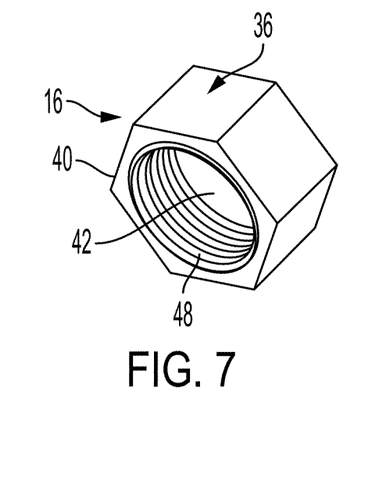
FIG. 7 is a perspective view of an exemplary embodiment of a cap nut of the fastener of FIG. 1.
Figure 8:
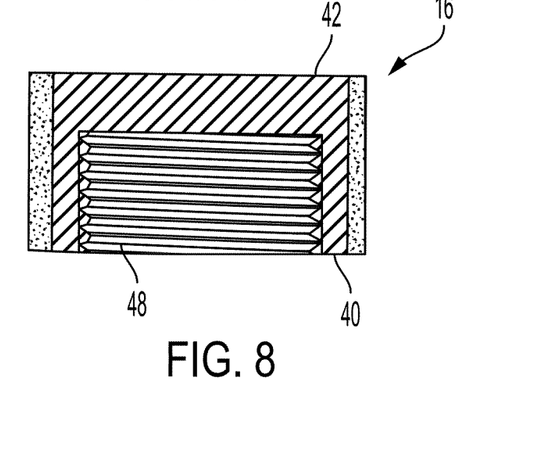
FIG. 8 is a sectional view of the cap nut of FIG. 7.

Cap 16 has an external torque application feature 36 that allows the cap to apply a torque or rotational force to fastener 10. In the illustrated embodiment, cap 16 is shown for ease of discussion with feature 36 illustrated as a hexagonal outer nut—that mates with known wrenches, sockets, and the like. In this embodiment, fastener 10 has an appearance of a normal hexagonal head bolt, but provides the functionality of a breakaway fastener.

Of course, it should be recognized that fastener 10 is contemplated by the present disclosure to include cap 16 with feature 36 of any desired configuration sufficient to apply torque to the fastener.

Cap 16 is also a hollow cylinder that has an open end 40, a closed end 42, and an internal thread 48 extending along axis 26 on at least a portion thereof at open end 40.

Thread 48 of cap 16 is configured to threadably engage thread 28 of stud 12. In this manner, cap 16 can be threadably engaged to stud 12 to cover open end 20 of the stud to provide fastener 10 with the appearance of a normal hexagonal head bolt, and as well as provide compression on pin 14 and tension within the stud.

Figure 3:
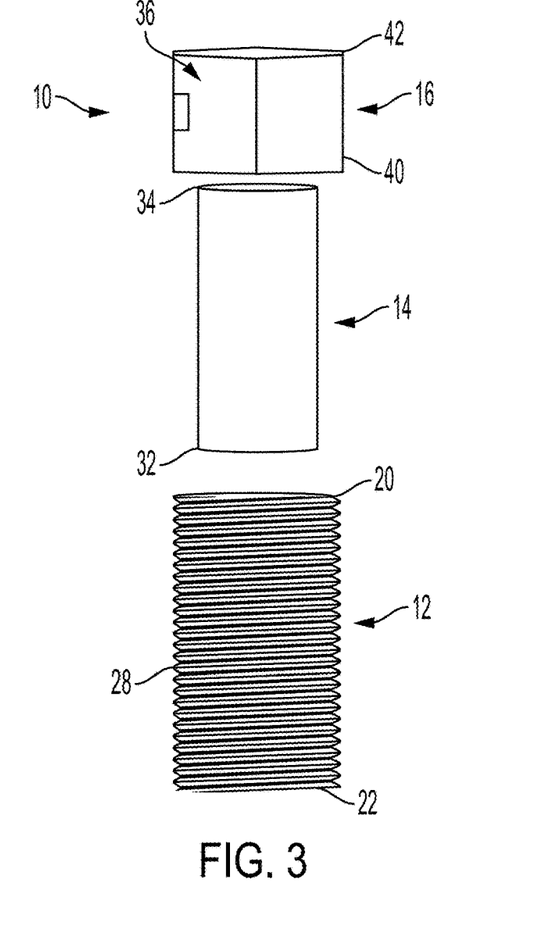
FIG. 3 is an exploded view of the fastener of FIG. 1.

To assemble fastener 10, pin 14 is dropped into stud 12 and cap 16 is threaded onto open end 20 of the stud via threads 28, 48 until upper end 34 of pin 14 extending from closed end 22 of the stud interferes with closed end 42 of the cap. In the assembled state, fastener 10 is configured so that application of torque to cap 16 results in the cap, stud 12, and pin 14 turning as a single unit.

When external thread 28 is received into a threaded bore (not shown), continued application of torque to cap 16 results in pin 14 applying a tensile force that has a maximum tensile stress on stud 12 between the cap and the upper most portion thread 28 that is engaged in the threaded bore until the stud breaks away or ruptures—under the combined tensile and shear loads at the uppermost engaged thread 28 as will be described in more detail below.

Figure 1:
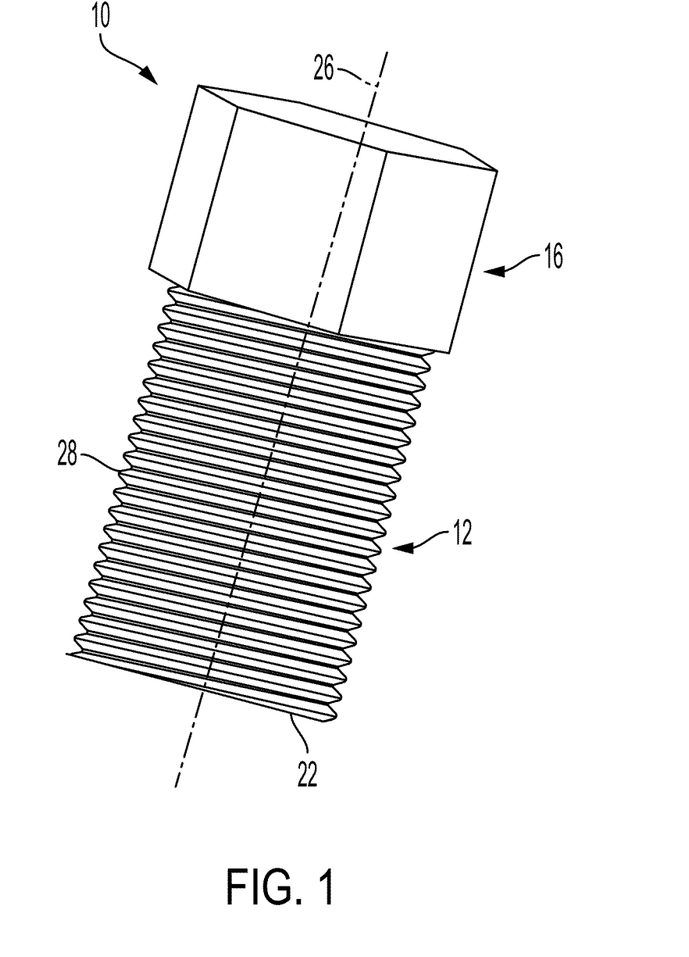
FIG. 1 is a perspective view of an exemplary embodiment of a breakaway threaded fastener according to the present disclosure.

Fastener 10, namely stud 12, pin 14, and cap 16, can be made of any desired material. It is contemplated for stud 12, pin 14, and cap 16 to be made of the same material or different materials. In some embodiments, fastener 10 can be made of electrically conductive material having sufficient strength for stud 12 to threadably fasten different threaded bores.

Pin 14 is illustrated by way of example as a solid rod of material. However, the present disclosure contemplates any configuration of pin 14 sufficient to apply tension to stud 12 sufficient to rupture the stud. For example, fastener 10 is configured so that pin 14 has a compressive failure point that is higher than the tensile failure point of stud 12.

In some embodiments, fastener 10 is made of aluminum or aluminum alloys. In one particular embodiment, stud 12 and cap 16 are made of different alloys—with stud being softer than cap to avoid or mitigate galling during engagement of threads 28, 48. For example, stud 12 can be made of a T6061 aluminum alloy and cap 16 can be made of a T2011 aluminum alloy.

Advantageously, fastener 10 is configured so that stud 12 breaks away or ruptures upon the application of a predefined torque—and without the need for any additional movements (e.g., bending, etc.). Fastener 10 is configured for use without the need for any special tools or installation processes. Rather, the simple process of threadably engaging stud 12 with a threaded opening and tightening cap 16 with a common tool results in the breakaway of the stud—and the removal of the cap, the broken portion of the stud, and the pin. Moreover, the portion of stud 12 that remains in the threaded opening can be easily removed again without the need for any special tools or removal processes—but rather by inserting a common tool into the hollow portion remaining in the threaded opening.

The resultant length of the portion of stud 12 that remains is based on the uppermost thread 28—and not any predefined breakaway regions defined in the fastener. Thus, the length of fastener 10 remaining in the threaded opening can be thought of being self-sizing—defined by the depth that stud 12 is threaded into the opening.

Fastener 10, once assembled, is ready for use—namely to be threaded into a corresponding threaded opening. The threaded opening can be any desired threaded opening. One particular usage of fastener 10 is described below with simultaneous reference to FIGS. 9-12. Here, an electrical connector 50 is shown in use with one or more fasteners 10.

Figure 9:
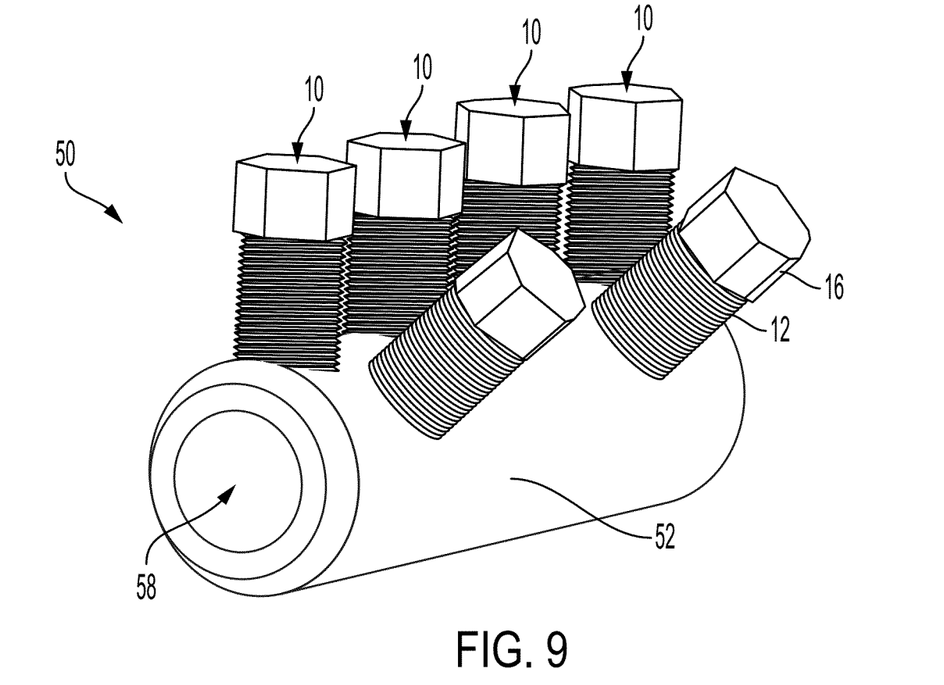
FIG. 9 is a first side perspective view of an exemplary embodiment of an electrical connector according to the present disclosure having one or more of the fasteners of FIG. 1.
Figure 12:
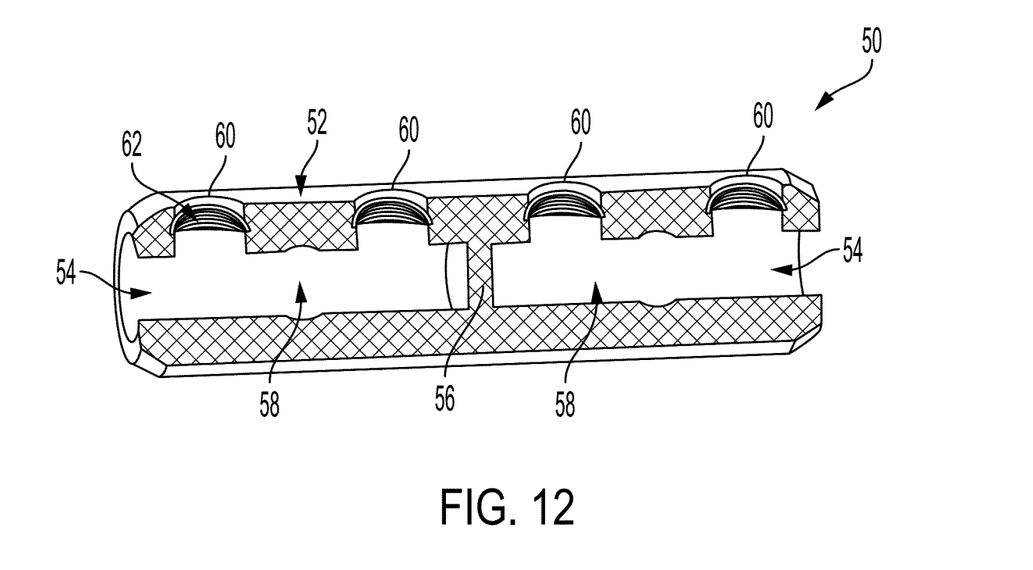
FIG. 12 is a sectional view of the connector of FIG. 9.

Connector 50 is of the type generally known as bolt splice connectors—that are used for connecting one or more electrical conductors (not shown). In the illustrated embodiment, connector 50 is shown having a cylindrical body 52 with an inner bore 54 and a separating wall 56, that separates the body into two conductor receiving areas 58.

Connector 50 includes one or more openings 60 extending through the body 52 into the areas 58. Openings 60 include an internal thread 62 that are configured to engage external thread 28 of fasteners 10. In this manner, fasteners 10 can be tightened onto an electrical conductor (not shown) within receiving area 58 to electrically and mechanically secure the conductor in connector 50. Thus, fastener 10 provides a clamping force to the electrical conductor so that connector 50 can find us with different conductor sizes.

Figure 10:
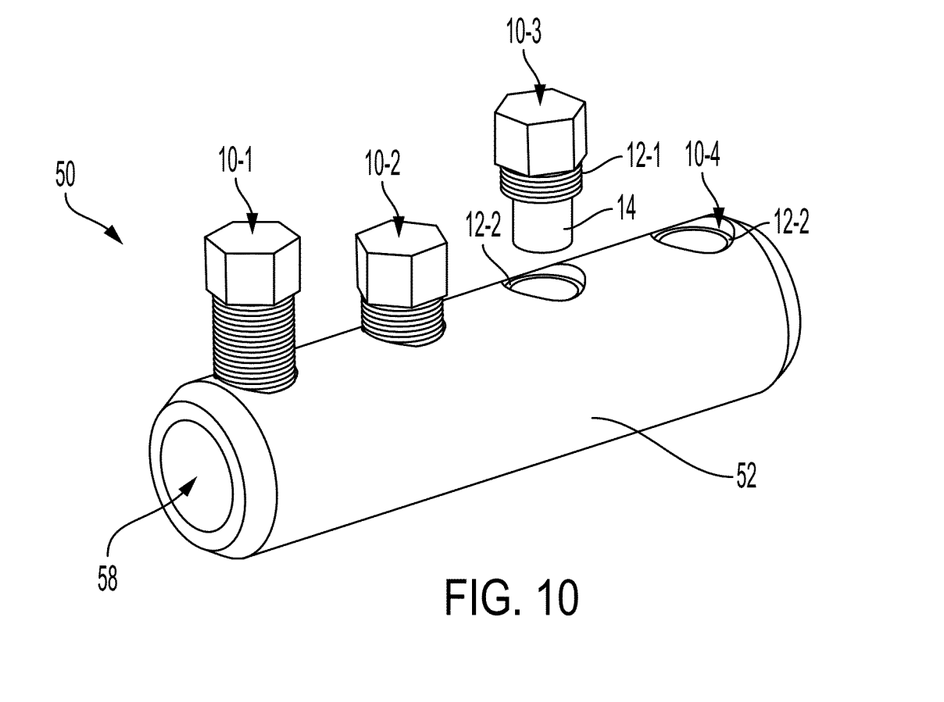
FIG. 10 is a second side perspective view of the connector of FIG. 9 illustrating different states of the fastener.
Figure 11:
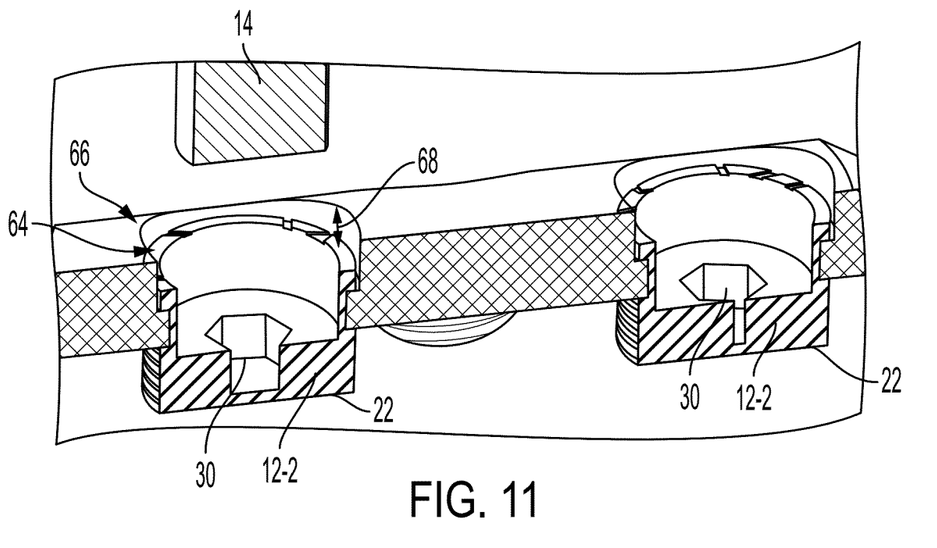
FIG. 11 is a partial sectional view of the connector of FIG. 10.

The use of fasteners 10 is described in more detail with specific reference to FIGS. 10 and 11. FIG. 10 shows four fasteners 10-1, 10-2, 10-3, and 10-4 in different stages of use. FIG. 11 shows a magnified view of fasteners 10-3 and 10-4, illustrating the final two stages of use.

Fastener 10-1 is shown installed in connector 50 before tightening onto a conductor.

Fastener 10-2 is shown after tightening into connector 50, but before reaching the breakaway point of stud 12.

Fastener 10-3 is shown after stud 12 has broken away into two portions 12-1, 12-2. In some embodiments, portion 12-1 is removed from connector 50 together with cap 16—and pin 14 can subsequently removed from portion 12-2. In other embodiments such as that shown, portion 12-1 is removed from connector 50 together with pin 14 and cap 16—where the pin can be retained in the cap and/or portion 12-1 by any desired means.

Fastener 10-4 is shown after removing portion 12-1 together with pin 14 and cap 16 from connector 50. Here, portion 12-2 is shown remaining in connector 50. Portion 12-2 can include a discontinuous upper edge 64—that may be sharp or otherwise present an undesired appearance. In some instances, edge 64 can protrude from an upper surface 66 of connector 50.

In some embodiments, connector 50 has a recess 68 that offsets internal thread 62 from upper surface 66 of connector 50. In this manner, connector 50 is configured to ensure that any edge 64 does not protrude beyond surface 66.

Advantageously, connector 50 does not rely upon any interference or abutment of fastener 10 with surfaces of the connector. Rather, the application of torque to cap 16 results in pin 14 applying a tensile force that has a maximum tensile stress on stud 12 between the cap and the upper most portion of thread 28 that is engaged with connector 50 (i.e., the portion of the thread approximately located at upper edge 64) until the stud breaks away or ruptures at the edge 64 under the combined tensile and shear loads.

During use of connector 50, two conductors will be inserted into each area 58 on opposite sides of wall 56. Fasteners 10 are then torqued until closed end 20 mechanically and electrically contacts the conductor to apply clamping forces on the conductors. When a predetermined torque is reached, cap 16 push on pin 14 so that the pin pushes on closed end 20 of stud 12 to create a tension within the stud. The portion of stud 12 (i.e., portion 12-2) that is threaded into connector 50 is held in place by thread 62 of the connector, while the portion of the stud (i.e., portion 12-1) that is sticking out of the connector and is not engaged with thread 62 will be placed in tension by pin 14. Once the predetermined tension created by the torque is met or exceeded, portion 12-2 of the stud will break off from portion 12-1 with cap 16 and pin 14 being removed together with portion 12-1.

Connector 50 is configured to ensure that fastener 10 always is flush or recessed with respect to surface 66 after installation due to the breakoff of the bolt where it is threaded and the recess on the connector body.

Referring to the drawings and in particular with simultaneous reference to FIGS. 13-17, another exemplary embodiment of a breakaway threaded fastener according to the present disclosure is shown. Here, component parts performing similar or analogous functions are referred to by reference numerals in multiples of one hundred from the embodiment of fastener 10 discussed above.

Figure 13:
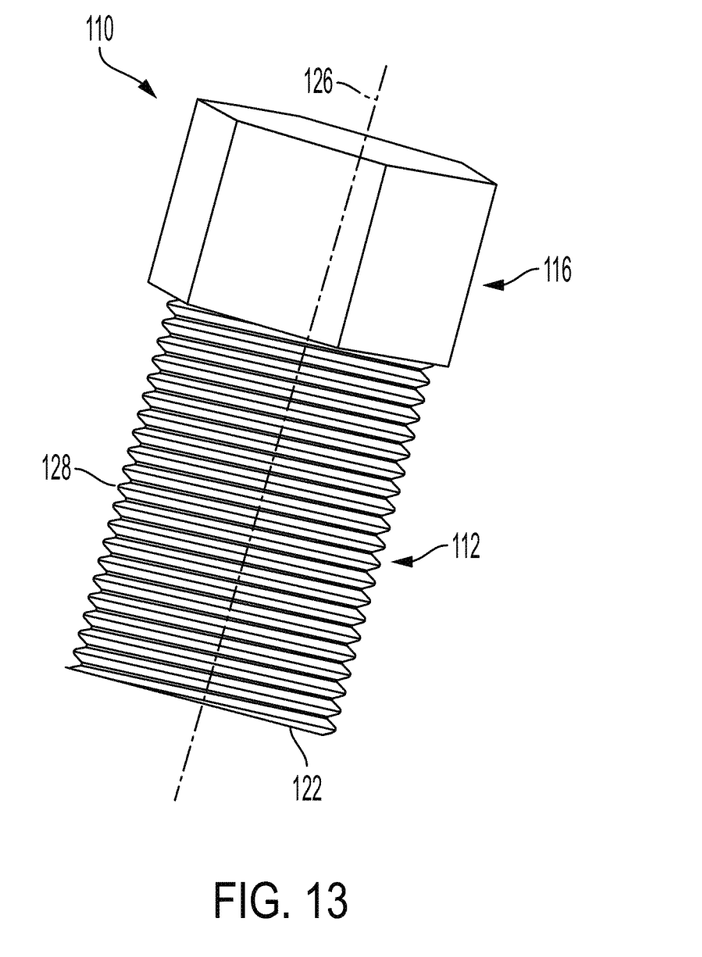
FIG. 13 is a perspective view of another exemplary embodiment of a breakaway threaded fastener according to the present disclosure.
Figure 14:
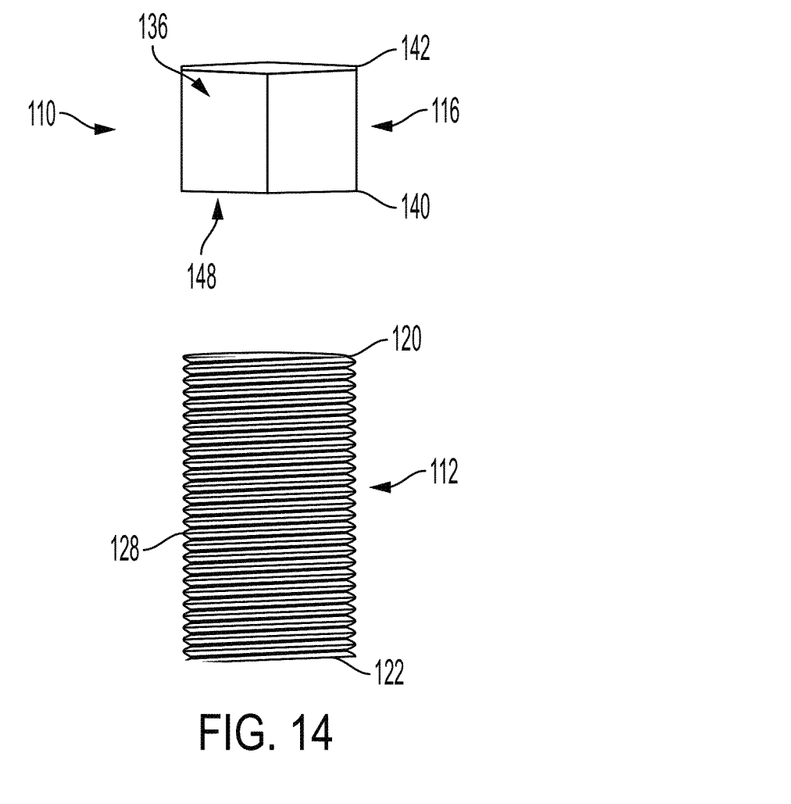
FIG. 14 is an exploded view of the fastener of FIG. 1.

Fastener 110 is a breakaway fastener that has a simple, easy to manufacture, assemble, and use construction. Fastener 110 includes a stud 112 and a cap 116. Advantageously, fastener 110 lacks the pin 14 of fastener 10.

Fastener 110, namely stud 112 and cap 116, can be made of any desired material. It is contemplated for stud 112 and cap 116 to be made of the same or different materials. In some embodiments, fastener 110 can be made of electrically conductive material having sufficient strength for stud 112 to threadably fasten different threaded bores.

Figure 15:
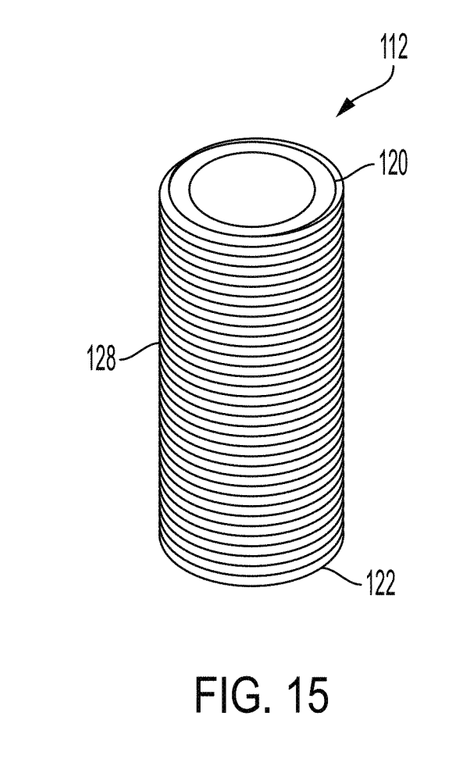
FIG. 15 is a perspective view of an exemplary embodiment of a stud of the fastener of FIG. 1.
Figure 16:
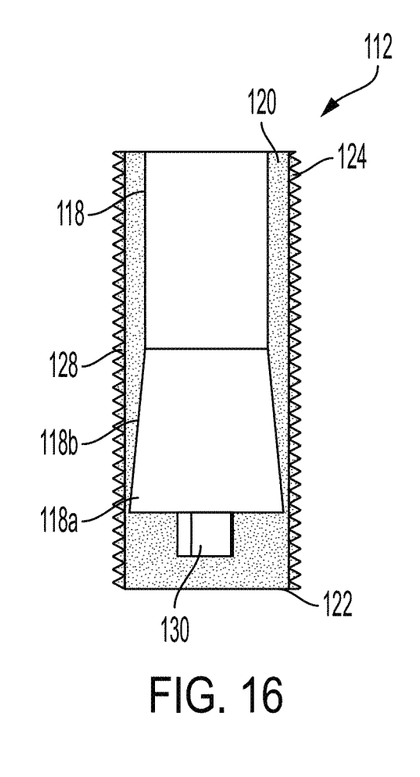
FIG. 16 is a sectional view of the stud of FIG. 5.

Stud 112 is a hollow cylinder having a wall 118, an open end 120, a closed end 122, and an exterior surface 124 of the wall extending along a longitudinal axis 126. Stud 112 includes an external thread 128 on at least a portion of exterior surface 124 at open end 120 and at least a portion of closed end 122. In some embodiments, thread 128 extends from open end 120 to closed end 122.

In some embodiments, closed end 122 includes an internal torque application feature 130—illustrated by way of example as a hex opening. Feature 130 allows for application of a removal torque to fastener 110 after installation in a threaded opening and after a portion of stud 112 has broken away together with cap 116. It should be recognized that fastener 110 is contemplated by the present disclosure to include stud 112 with feature 130 of any desired configuration sufficient to apply torque to the fastener.

Stud 112 can be configured so that wall 118 has a thickness—at least in regions that is thin enough to fail under torsion as will be described in more detail herein. In some embodiments, stud 112 has a minimal thickness 118*a* to wall 118 that ensures the stud breaks under torsion above a predetermined torsional limit.

In the embodiment illustrated in FIG. 16, minimal thickness 118*a* is the result of a partial taper 118*b* on an inner surface of wall 118—namely a taper that starts offset from open end 120 and ends at the minimal thickness.

Figure 17:
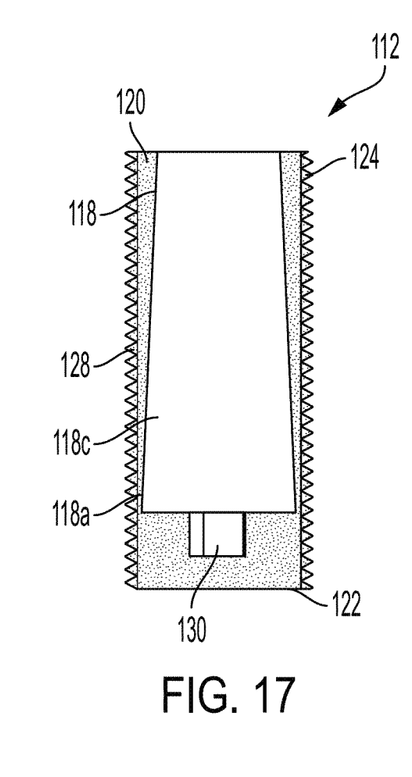
FIG. 17 is a sectional view of an alternate embodiment of the stud of FIG. 5.

In the embodiment illustrated in FIG. 17, minimal thickness 118a is the result of a full taper 118c on an inner surface of wall 118—namely a taper that starts at open end 120 and ends at the minimal thickness.

Of course, it is contemplated by the present disclosure for minimal thickness 118a to be formed by thinning a region of wall 118 from the inner surface of stud 112 or from exterior surface 124 of the stud.

In this manner, fastener 110 has a torsional breakaway point that—once exceeded—breaks stud 112 into two portions proximate minimal thickness 118a of wall 118.

Cap 116 has an external torque application feature 136 that allows the cap to apply a torque or rotational force to fastener 110. In the illustrated embodiment, cap 116 is shown for ease of discussion with feature 136 illustrated as a hexagonal outer nut—that mates with known wrenches, sockets, and the like. In this embodiment, fastener 110 has an appearance of a normal hexagonal head bolt, but provides the functionality of a breakaway fastener.

Of course, it should be recognized that fastener 110 is contemplated by the present disclosure to include cap 116 with feature 136 of any desired configuration sufficient to apply torque to the fastener.

Cap 116 is also a hollow cylinder that has an open end 140 and an internal thread 148 extending along axis 126 on at least a portion thereof at open end 140.

Thread 148 of cap 116 is configured to threadably engage thread 128 of stud 112. In this manner, cap 116 can be threadably engaged to stud 112 to cover open end 120 of the stud to provide fastener 110 with the appearance of a normal hexagonal head bolt.

To assemble fastener 110, cap 116 is threaded onto open end 120 of the stud via threads 128, 148. In the assembled state, fastener 110 is configured so that application of torque to cap 116 results in rotation of the cap and stud 112.

Fastener 110, similar to fastener 10 discussed above, is configured for use with connector 50 and minimal thickness 118a is, in some embodiments, positioned to ensure that the fastener is flush or recessed with respect to surface 66 after installation due to the breakoff of the fastener where it is threaded and the recess on the connector body.

Referring to the drawings and in particular with simultaneous reference to FIGS. 18-21, yet another exemplary embodiment of a breakaway threaded fastener according to the present disclosure is shown. Here, component parts performing similar or analogous functions are referred to by reference numerals in multiples of two hundred from the embodiment of fastener 10 discussed above.

Figure 18:
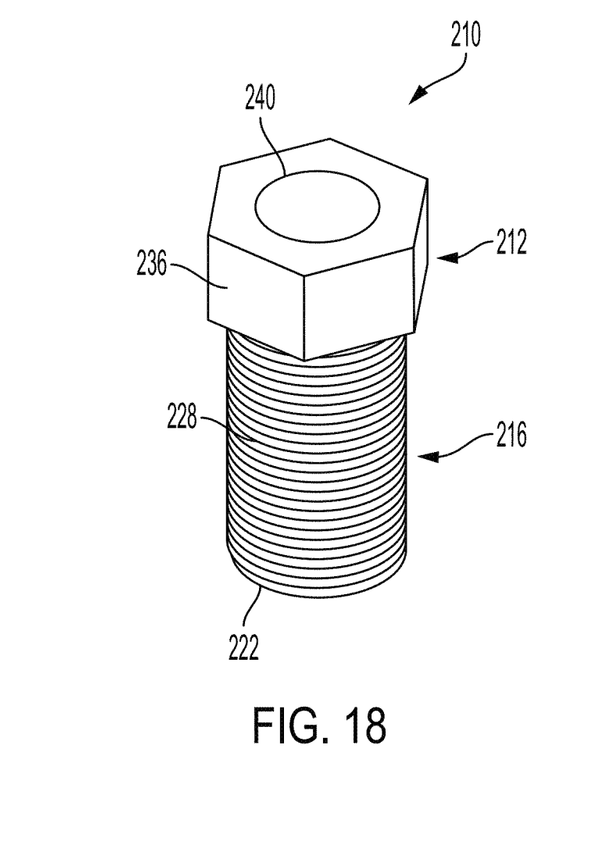
FIG. 18 is a perspective view of yet another exemplary embodiment of a breakaway threaded fastener according to the present disclosure.
Figure 19:
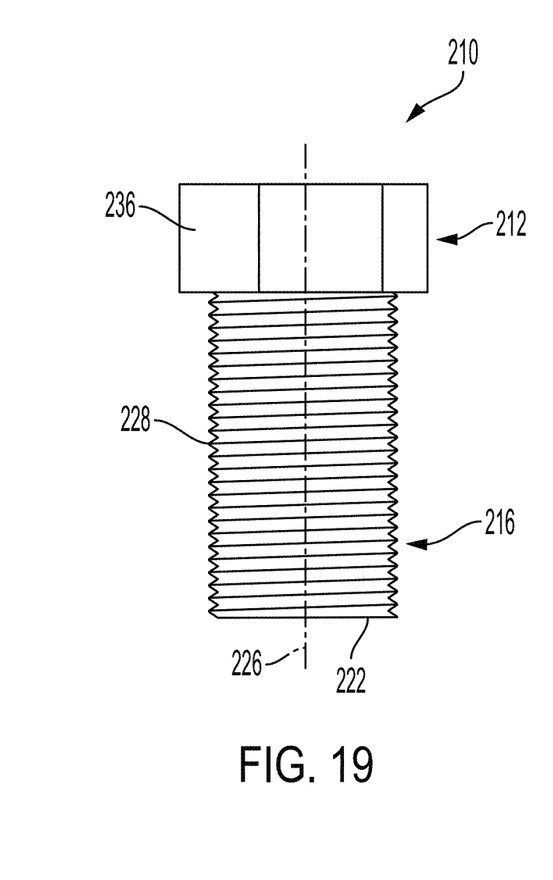
FIG. 19 is a side view of the fastener of FIG. 18.

Fastener 210 is a breakaway fastener that has a simple, easy to manufacture and use construction. Fastener 210 includes a stud 212 that is unitary and one-piece with a cap 216.

Fastener 210, namely stud 212 and cap 216, can be made of any desired material. In some embodiments, fastener 210 can be made of electrically conductive material having sufficient strength for the fastener to threadably fasten different threaded bores.

Fastener 210 has, at cap 216, an external torque application feature 236 and an open end 240 at an upper end of cap 216. In the illustrated embodiment, feature 236 illustrated as a hexagonal outer nut—that mates with known wrenches, sockets, and the like. In this embodiment, fastener 210 has an appearance of a normal hexagonal head bolt, but provides the functionality of a breakaway fastener.

Of course, it should be recognized that fastener 210 is contemplated by the present disclosure to include feature 236 of any desired configuration sufficient to apply torque to the fastener.

Fastener 210 is configured so that application of torque to cap 216 results in rotation of the cap and stud 212.

Figure 20:
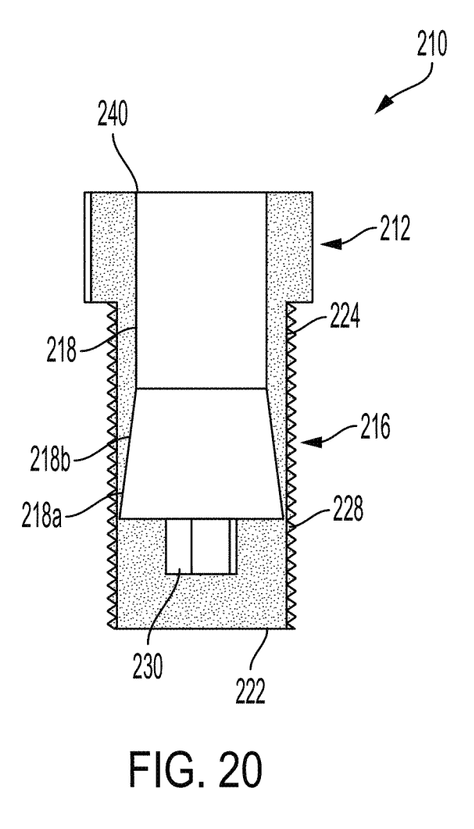
FIG. 20 is a sectional view of the fastener of FIG. 18.

Fastener 210 has, at stud 212, a hollow cylinder having a wall 218, a closed end 222, and an exterior surface 224 of the wall extending along a longitudinal axis 226. Stud 212 includes an external thread 228 on at least a portion of exterior surface 224.

In some embodiments, closed end 222 includes an internal torque application feature 230—illustrated by way of example as a hex opening. Feature 230 allows for application of a removal torque to fastener 210 after installation in a threaded opening and after a portion of stud 212 has broken away together with cap 216. It should be recognized that fastener 210 is contemplated by the present disclosure to include stud 212 with feature 230 of any desired configuration sufficient to apply torque to the fastener.

In the embodiment illustrated in FIG. 20, minimal thickness 218a is the result of a partial taper 218b on an inner surface of wall 218—namely a taper that starts offset from open end 240 and ends at the minimal thickness.

Figure 21:
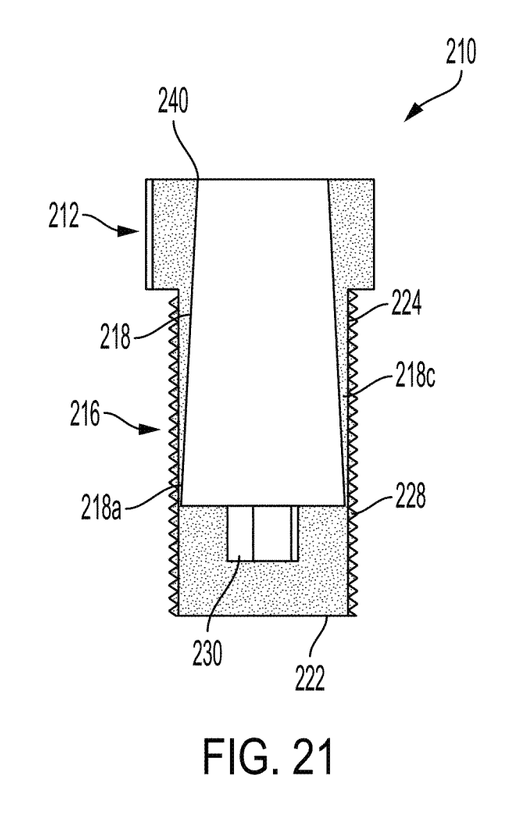
FIG. 21 is a sectional view of an alternate embodiment of the fastener of FIG. 18.

In the embodiment illustrated in FIG. 21, minimal thickness 218a is the result of a full taper 218c on an inner surface of wall 218—namely a taper that starts at open end 240 and ends at the minimal thickness.

Of course, it is contemplated by the present disclosure for minimal thickness 218a to be formed by thinning a region of wall 218 from the inner surface of stud 212 or from exterior surface 224 of the stud.

In this manner, fastener 210 has a torsional breakaway point that—once exceeded—breaks stud 212 into two portions proximate minimal thickness 218a of wall 218.

Fastener 210, similar to fasteners 10, 110 discussed above, is configured for use with connector 50 and minimal thickness 218a is, in some embodiments, positioned to ensure that the fastener is flush or recessed with respect to surface 66 after installation due to the breakoff of the fastener where it is threaded and the recess on the connector body.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

| | |
|---|---|
| breakaway threaded fastener 10, 110, 210 | open end 40, 140, 240 |
| stud 12, 112, 212 | closed end 42 |
| pin 14 | internal thread 48, 148 |

-continued

PARTS LIST

| | |
|---|---|
| cap 16, 116, 216 | electrical connector 50 |
| wall 18, 118, 218 | cylindrical body 52 |
| minimal thickness 118a, 218a | inner bore 54 |
| partial taper 118b, 218b | separating wall 56 |
| full taper 118c, 218c | conductor receiving areas 58 |
| open end 20, 120 | openings 60 extending internal thread 62 |
| closed end 22, 122, 222 | fasteners 10-1, 10-2, 10-3, and 10-4 |
| exterior surface 24, 124, 224 | |
| longitudinal axis 26, 126, 226 | |
| external thread 28, 128, 228 | stud portions 12-1, 12-2 |
| internal torque application feature 30, 130, 230 | discontinuous upper edge 64 |
| | upper surface 66 |
| bottom end 32 | recess 68 |
| top end 34 | |
| external torque application feature 36, 136, 236 | |

What is claimed is:

1. A breakaway threaded fastener, comprising:
a cap integral to a stud, the cap having an external torque application feature and an open end, the stud having a hollow cavity with a closed end, a wall, and an outer surface, the outer surface having an external thread; and
a minimum wall thickness defined in the wall at the closed end, the minimum wall thickness being configured to break the stud into two portions under torsion above a predetermined torsional limit.

2. The breakaway threaded fastener of claim 1, wherein the external torque application feature is a hexagonal outer nut.

3. The breakaway threaded fastener of claim 1, wherein the fastener has an appearance of a normal hexagonal head bolt.

4. The breakaway threaded fastener of claim 1, wherein the stud and cap are made of electrically conductive materials.

5. The breakaway threaded fastener of claim 1, wherein the minimum wall thickness is defined by a partial taper, wherein the partial taper is offset from the open end of the cap and runs to the closed end of the stud.

6. The breakaway threaded fastener of claim 1, wherein the minimum wall thickness is defined by a full taper, wherein the full taper runs from the open end of the cap to the closed end of the stud.

7. The breakaway threaded fastener of claim 1, wherein the stud comprises an internal torque application feature at the closed end of the hollow cavity.

8. The breakaway threaded fastener of claim 7, wherein the internal torque application feature is a hexagonal opening in the closed end.

9. An electrical connector, comprising:
a cylindrical body with an inner bore defining an electrical conductor receiving area;
an opening in the cylindrical body extending into the electrical conductor receiving area, the opening having an internal thread; and
a breakaway threaded fastener, the breakaway threaded fastener having cap integral to a stud, the cap having an external torque application feature and an open end, the stud having a hollow cavity with a closed end, a wall, and an outer surface, the outer surface having an external thread, the wall having minimum wall thickness defined at the closed end that is configured to break the stud into two portions under torsion above a predetermined torsional limit,
wherein the external thread is threadably received in the internal thread of the opening.

10. A breakaway threaded fastener, comprising:
a stud having a hollow cavity with a closed end, a wall, and an outer surface, the outer surface having an external thread;
a cap having another hollow cavity with an open end and an internal thread, the cap being threadably engaged to the open end of the stud via the internal and external threads; and
a minimum wall thickness defined in the wall, the minimum wall thickness being configured to break the stud into two portions under torsion above a predetermined torsional limit, wherein the minimum wall thickness is defined by a partial taper that is offset from the open end of the cap and runs to the closed end of the stud.

11. The breakaway threaded fastener of claim 10, wherein the cap comprises an external torque application feature.

12. The breakaway threaded fastener of claim 11, wherein the external torque application feature is a hexagonal outer nut.

13. The breakaway threaded fastener of claim 10, wherein the stud comprises an internal torque application feature at the closed end of the hollow cavity.

14. The breakaway threaded fastener of claim 13, wherein the internal torque application feature is a hexagonal opening in the closed end.

15. A breakaway threaded fastener, comprising:
a stud having a hollow cavity with a closed end, a wall, and an outer surface, the outer surface having an external thread;
a cap having another hollow cavity with an open end and an internal thread, the cap being threadably engaged to the open end of the stud via the internal and external threads; and
a minimum wall thickness defined in the wall, the minimum wall thickness being configured to break the stud into two portions under torsion above a predetermined torsional limit, wherein the minimum wall thickness is defined by a full taper, wherein the full taper runs from the open end of the cap to the closed end of the stud.

16. A breakaway threaded fastener, comprising:
a cap integral to a stud, the cap having an external torque application feature and an open end, the stud having a hollow cavity with a closed end, a wall, and an outer surface, the outer surface having an external thread; and
a minimum wall thickness defined in the wall, the minimum wall thickness being configured to break the stud into two portions under torsion above a predetermined torsional limit; and
a minimum wall thickness defined in the wall, the minimum wall thickness being configured to break the stud into two portions under torsion above a predetermined torsional limit,
wherein the minimum wall thickness is defined by either a partial taper that is offset from the open end of the cap and runs to the closed end of the stud or a full taper that runs from the open end of the cap to the closed end of the stud.

* * * * *